Figure 6:
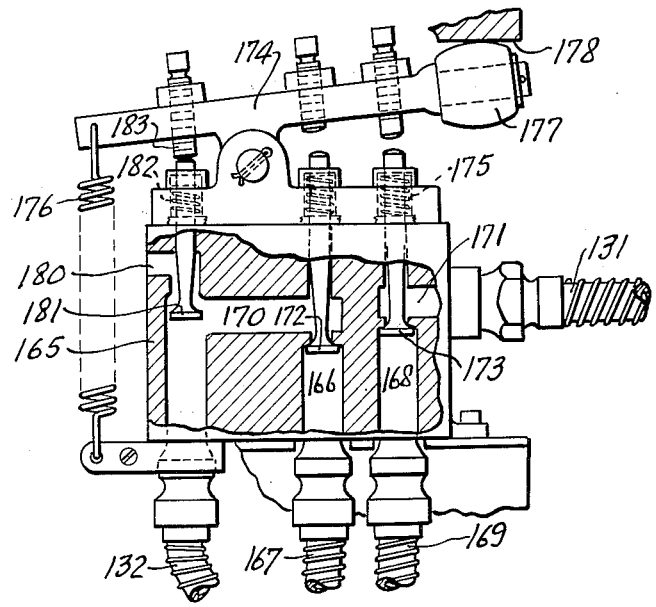

March 14, 1944. H. A. ROSELUND 2,344,108
MEANS FOR MOVING SPRAY GUNS OR OTHER DEVICES
THROUGH PREDETERMINED PATHS
Filed Aug. 17, 1939 17 Sheets-Sheet 1
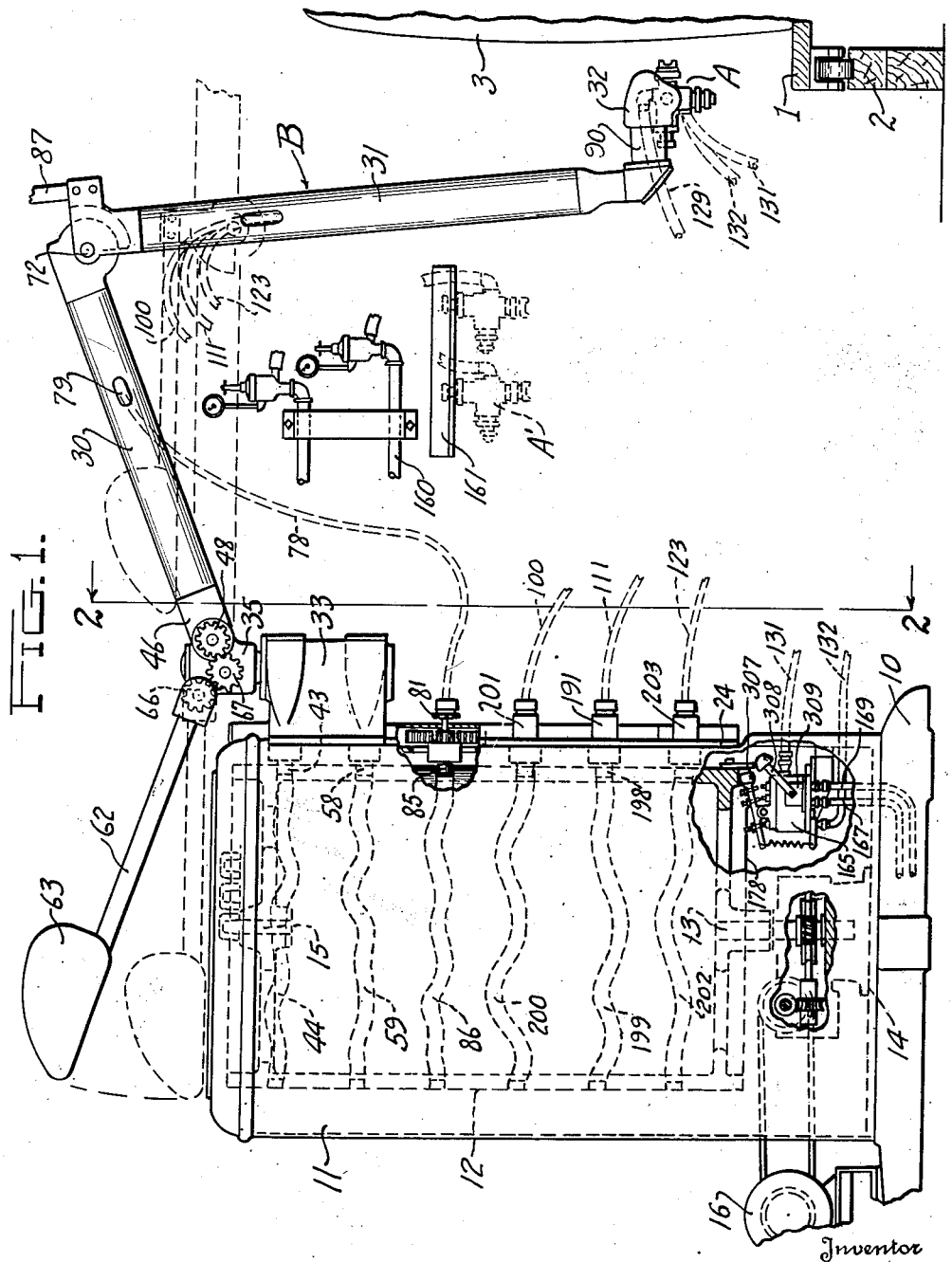
Inventor
Harold A. Roselund
By Owen & Owen
Attorneys

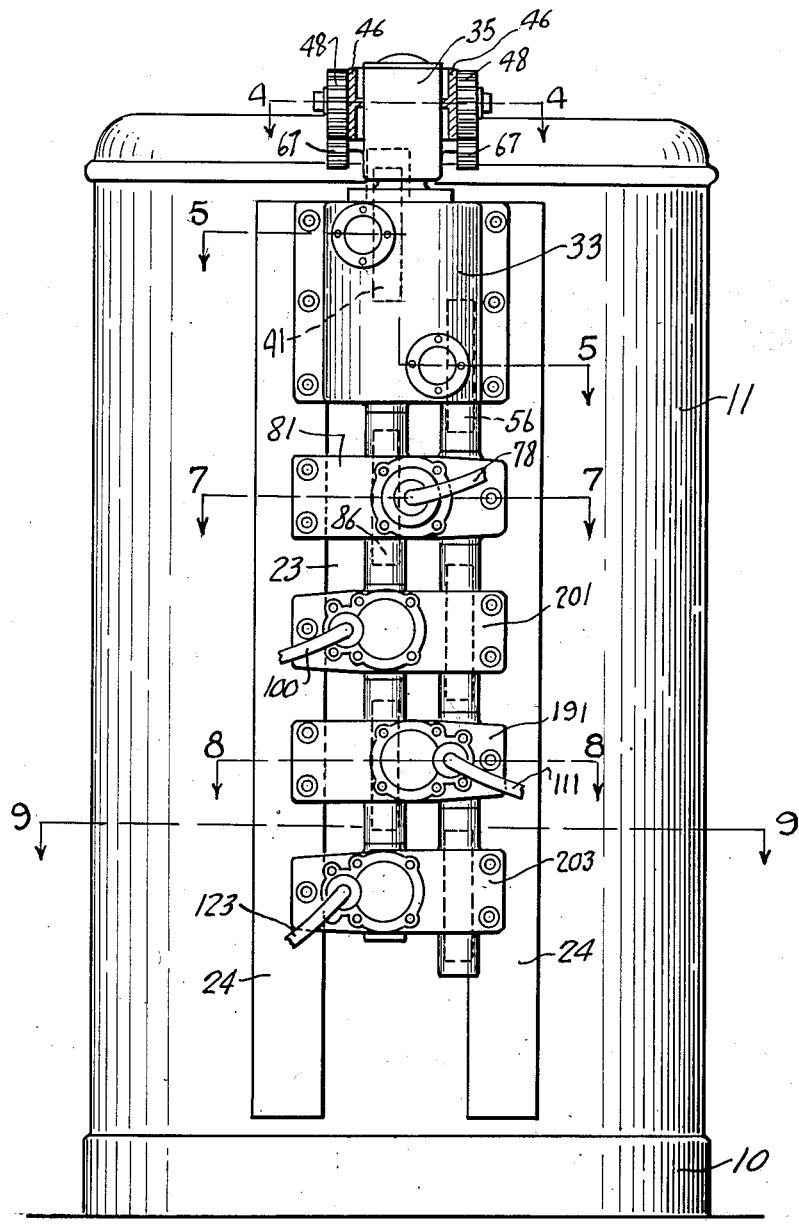

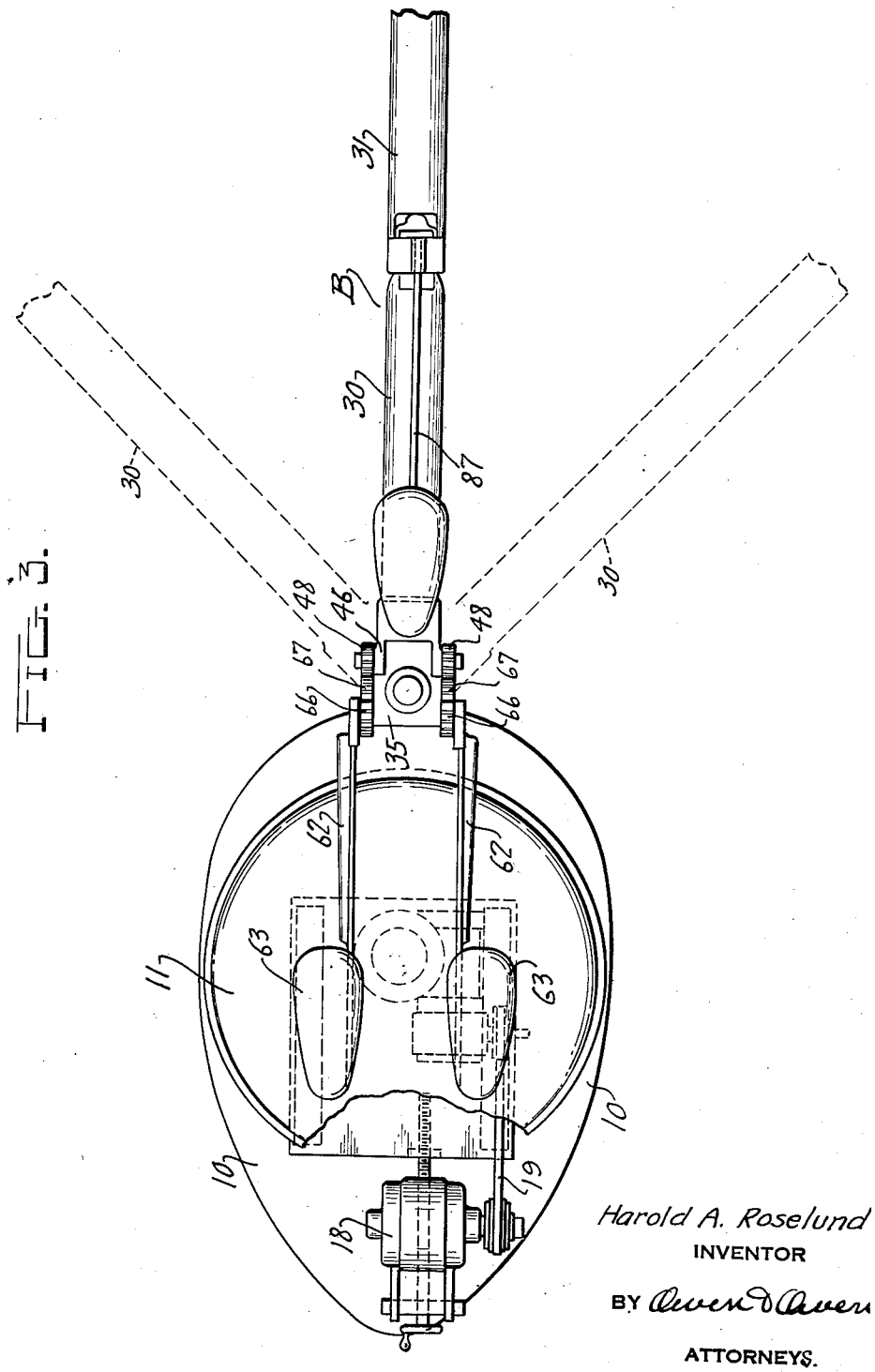

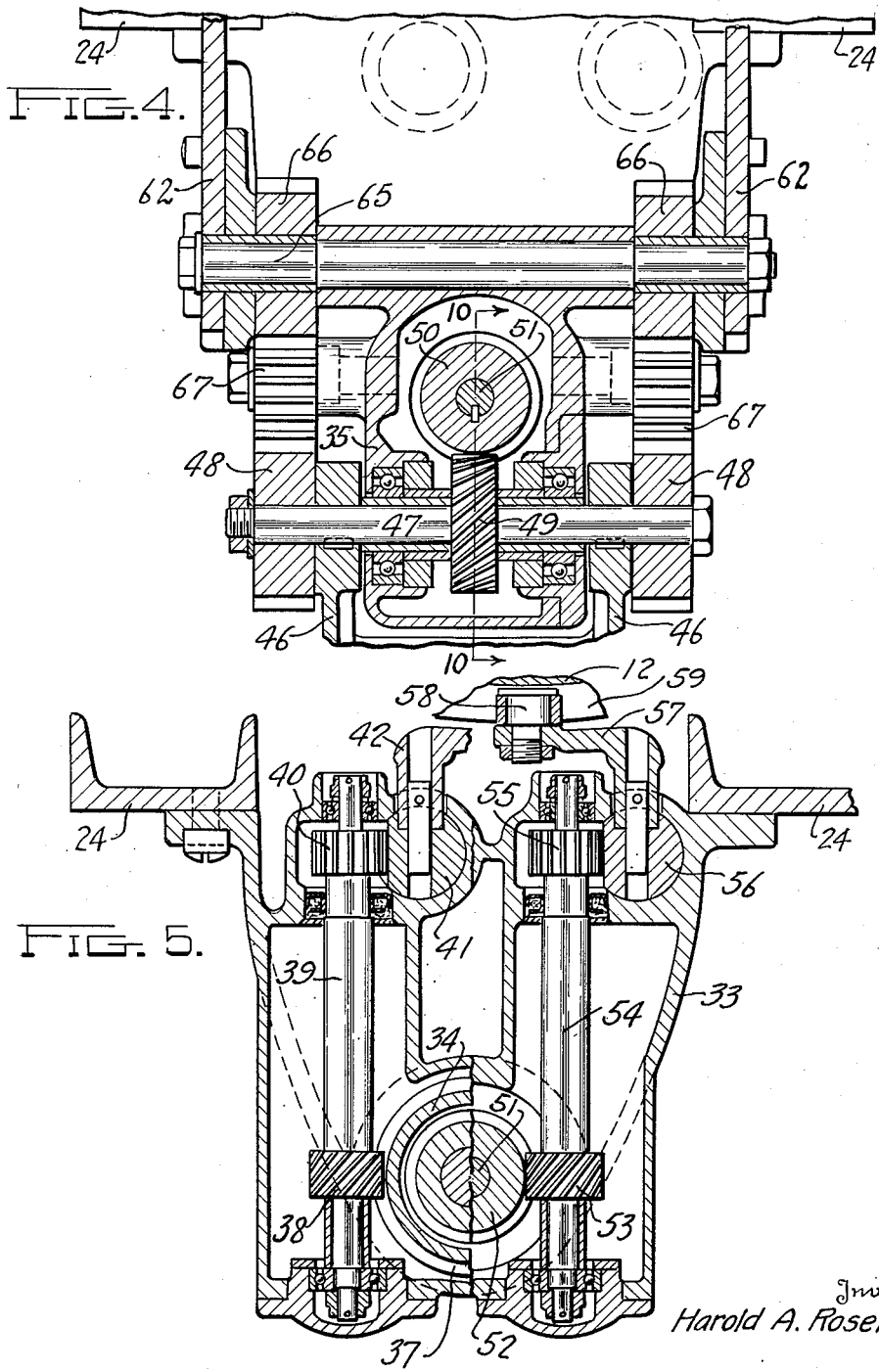

March 14, 1944. H. A. ROSELUND 2,344,108
MEANS FOR MOVING SPRAY GUNS OR OTHER DEVICES
THROUGH PREDETERMINED PATHS
Filed Aug. 17, 1939 17 Sheets-Sheet 5

Inventor
Harold A. Roselund

By Owen & Owen
Attorneys.

Inventor
Harold A. Roselund

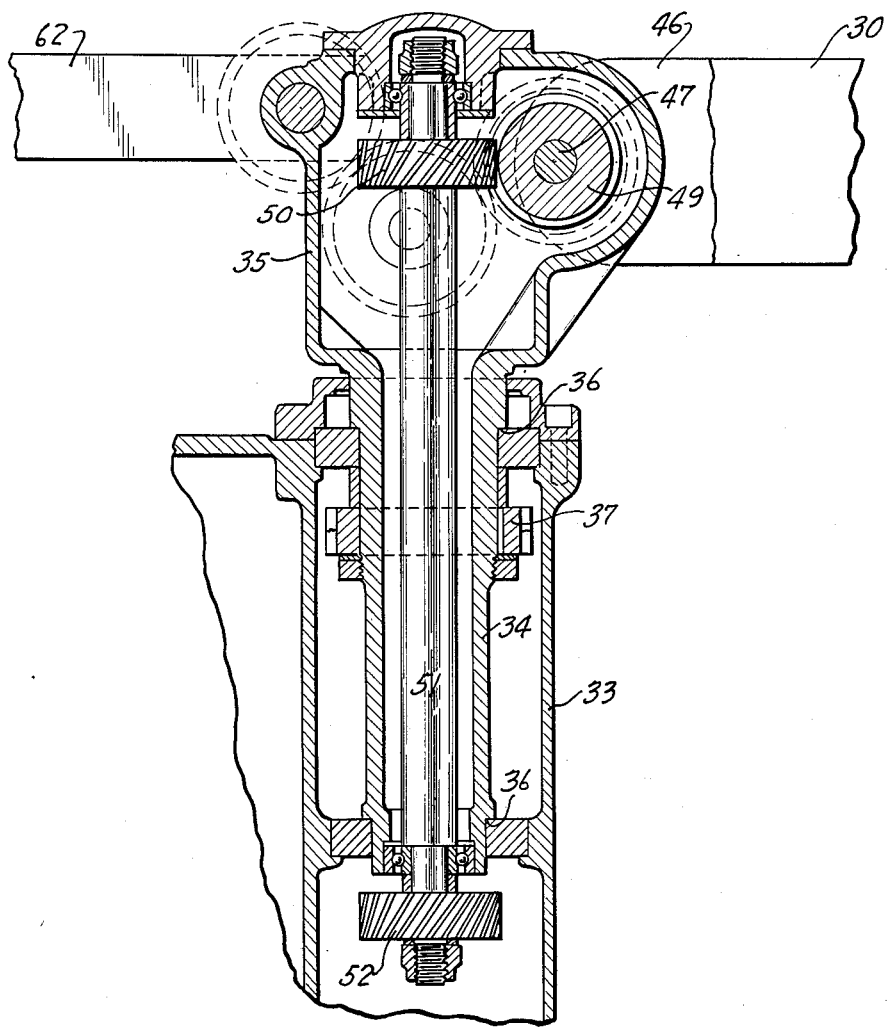

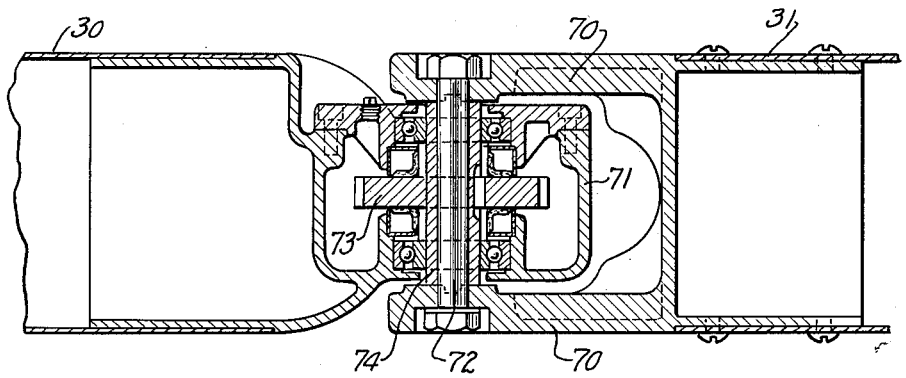
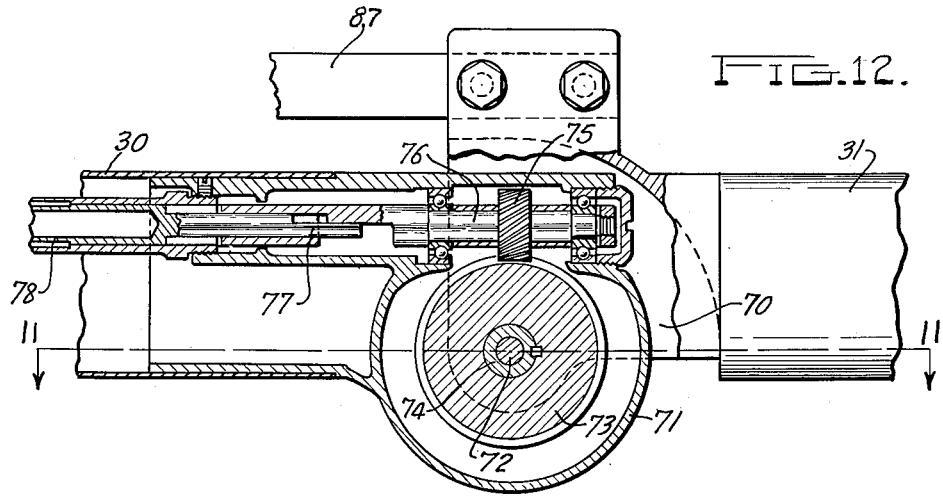

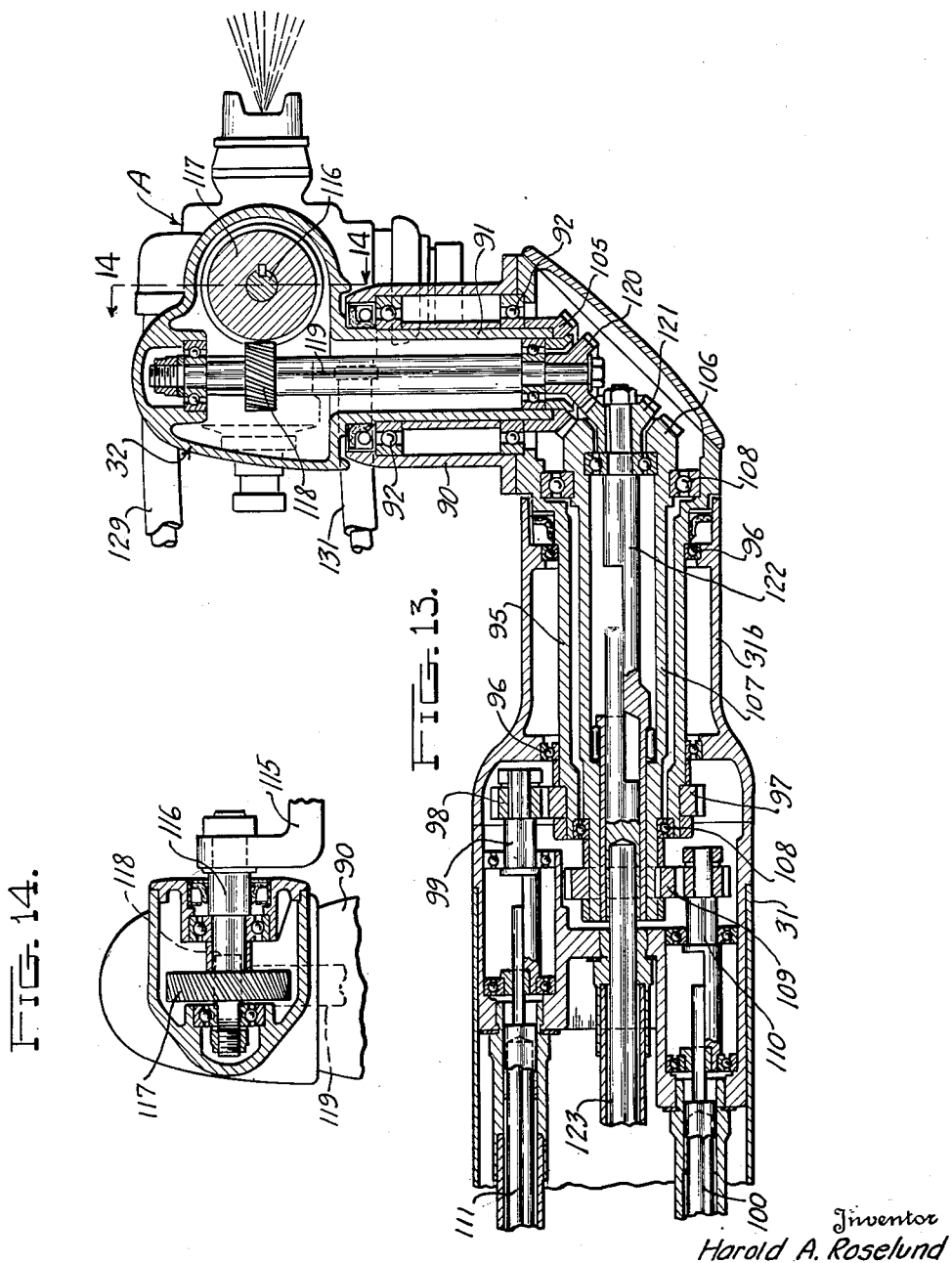

March 14, 1944.   H. A. ROSELUND   2,344,108
MEANS FOR MOVING SPRAY GUNS OR OTHER DEVICES
THROUGH PREDETERMINED PATHS
Filed Aug. 17, 1939   17 Sheets-Sheet 10
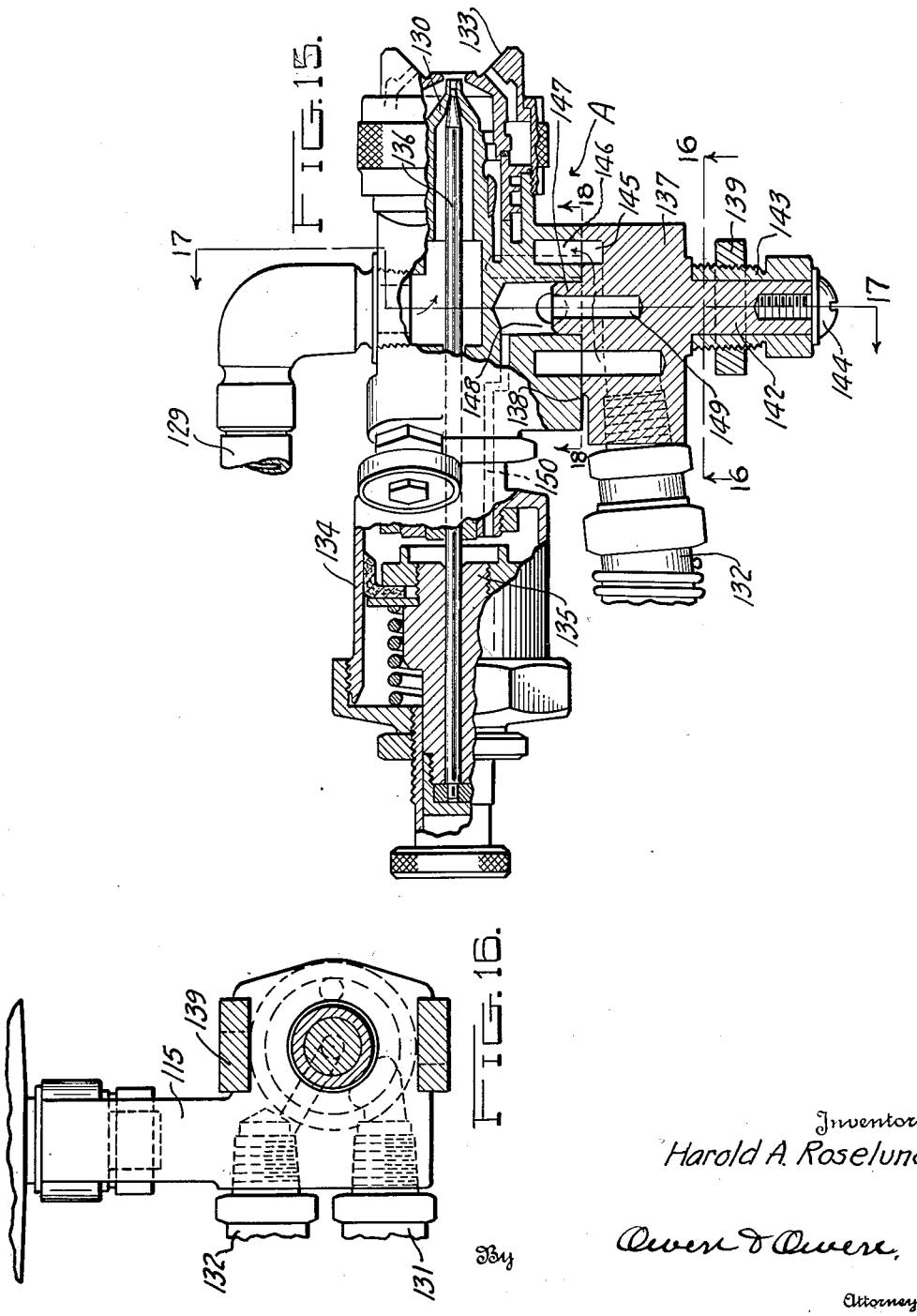
Inventor
Harold A. Roselund
By
Owen & Owen
Attorneys.

March 14, 1944. H. A. ROSELUND 2,344,108
MEANS FOR MOVING SPRAY GUNS OR OTHER DEVICES
THROUGH PREDETERMINED PATHS
Filed Aug. 17, 1939 17 Sheets-Sheet 11
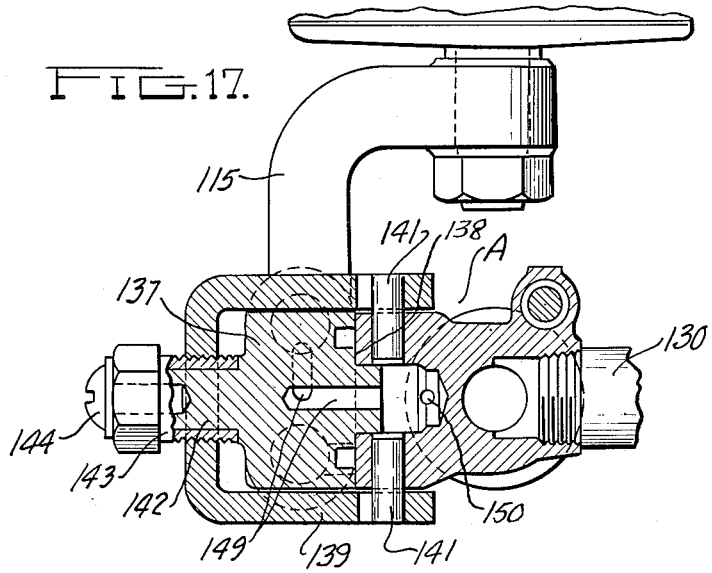
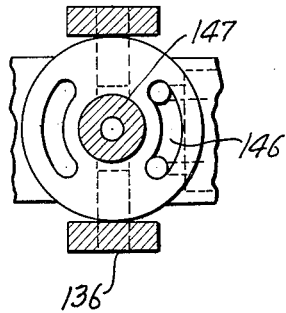
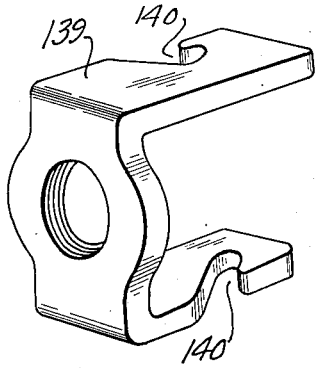
Inventor
Harold A. Roselund
By Owen & Owen
Attorneys.

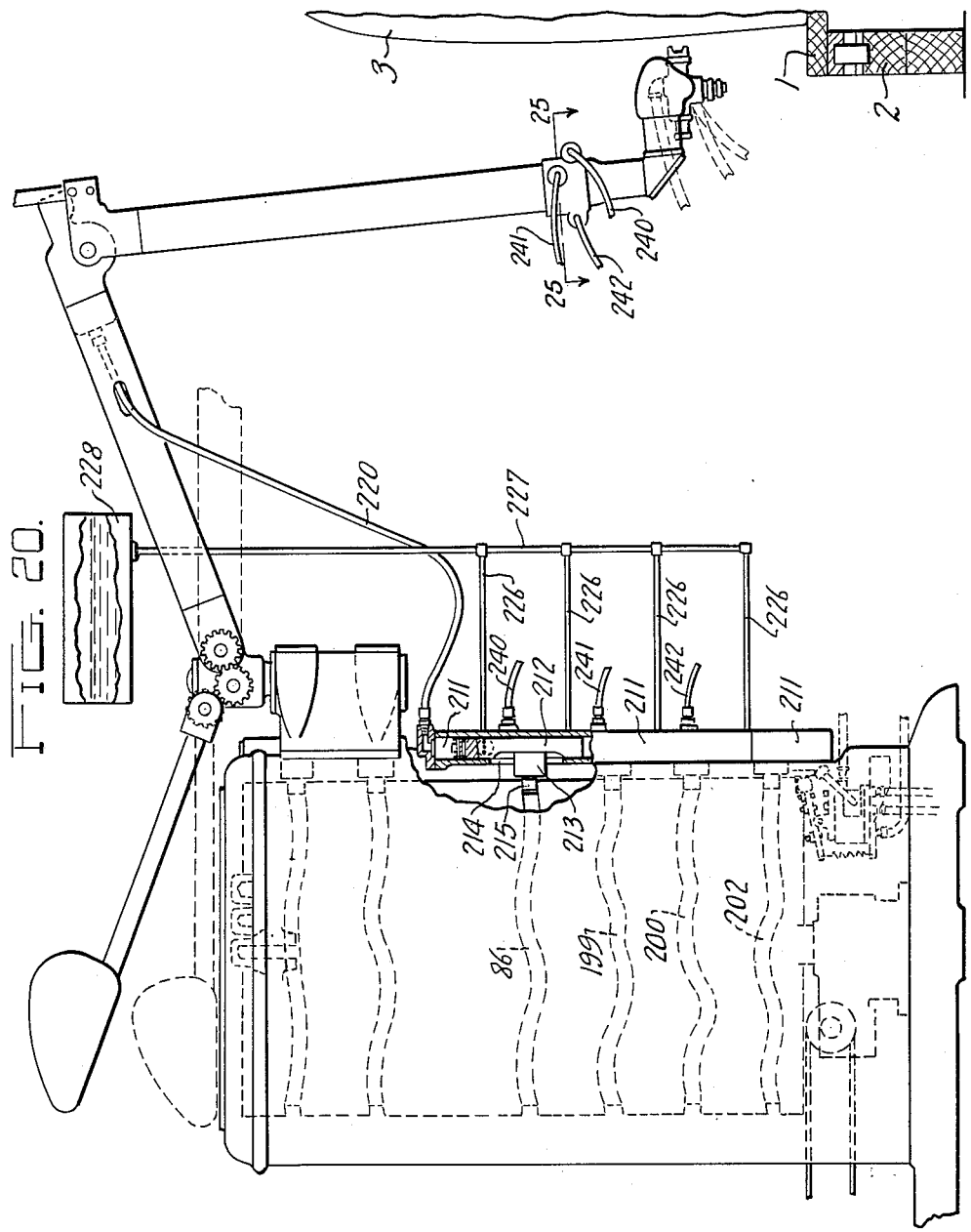

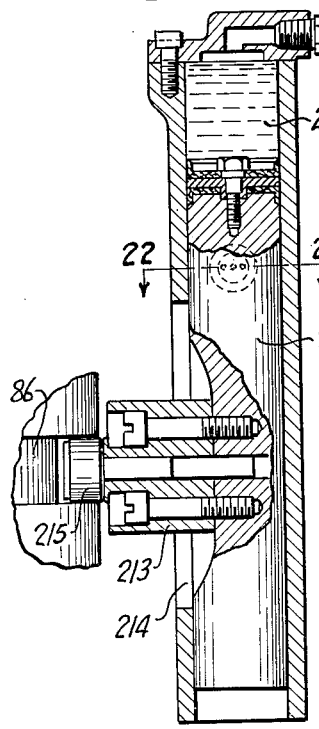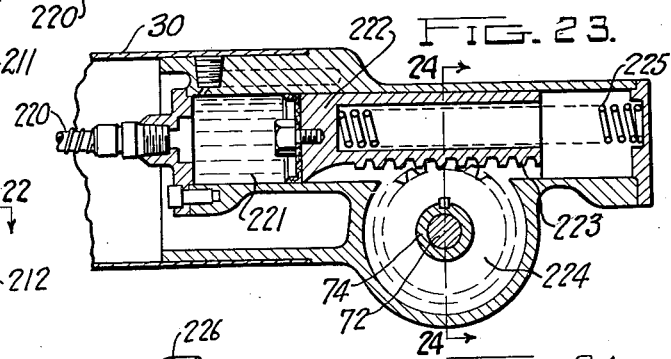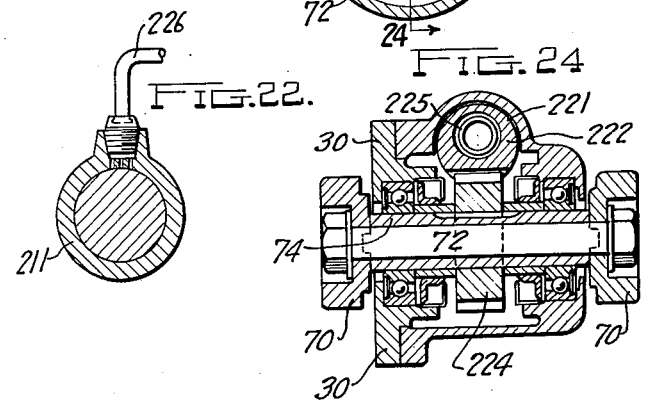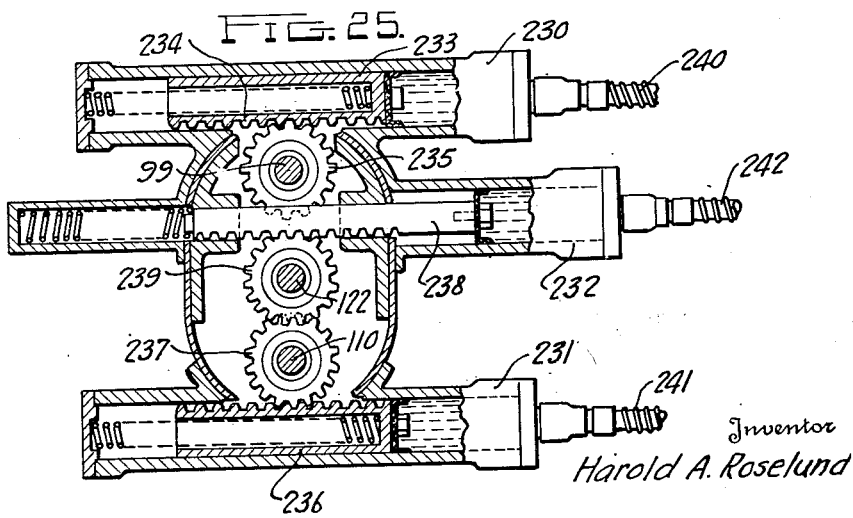

March 14, 1944. H. A. ROSELUND 2,344,108
MEANS FOR MOVING SPRAY GUNS OR OTHER DEVICES
THROUGH PREDETERMINED PATHS
Filed Aug. 17, 1939 17 Sheets-Sheet 14
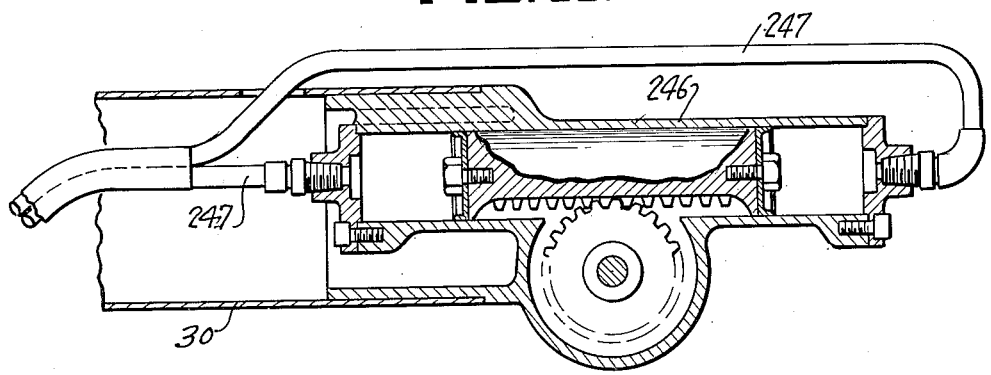
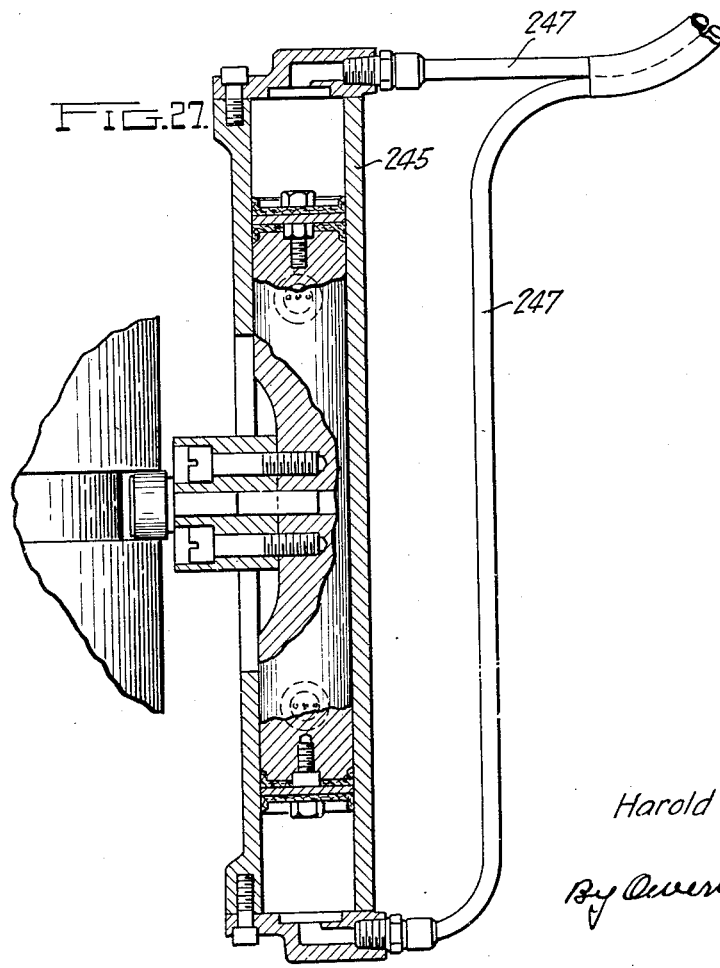
Inventor
Harold A. Roselund
By Owen & Owen
Attorneys.

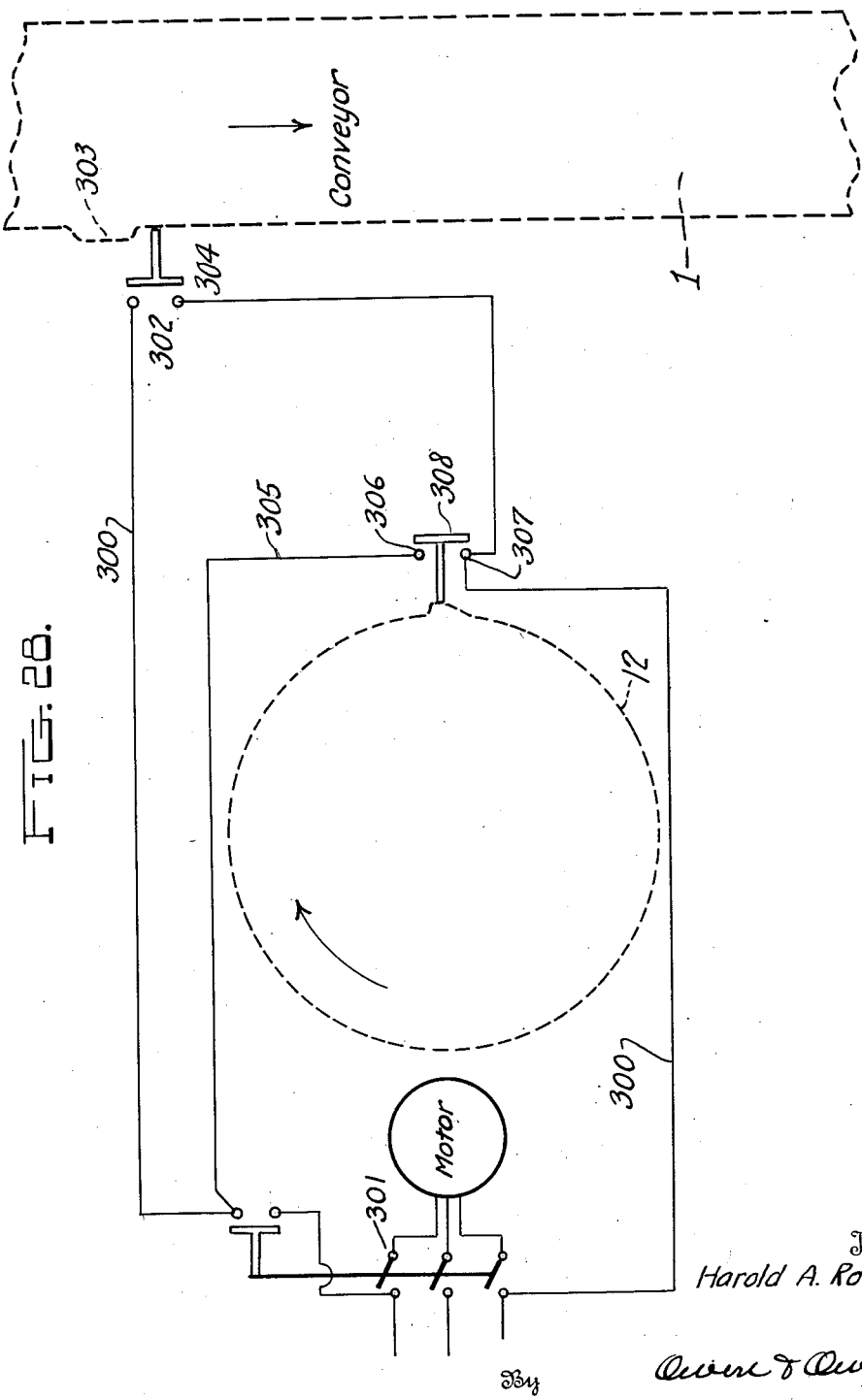

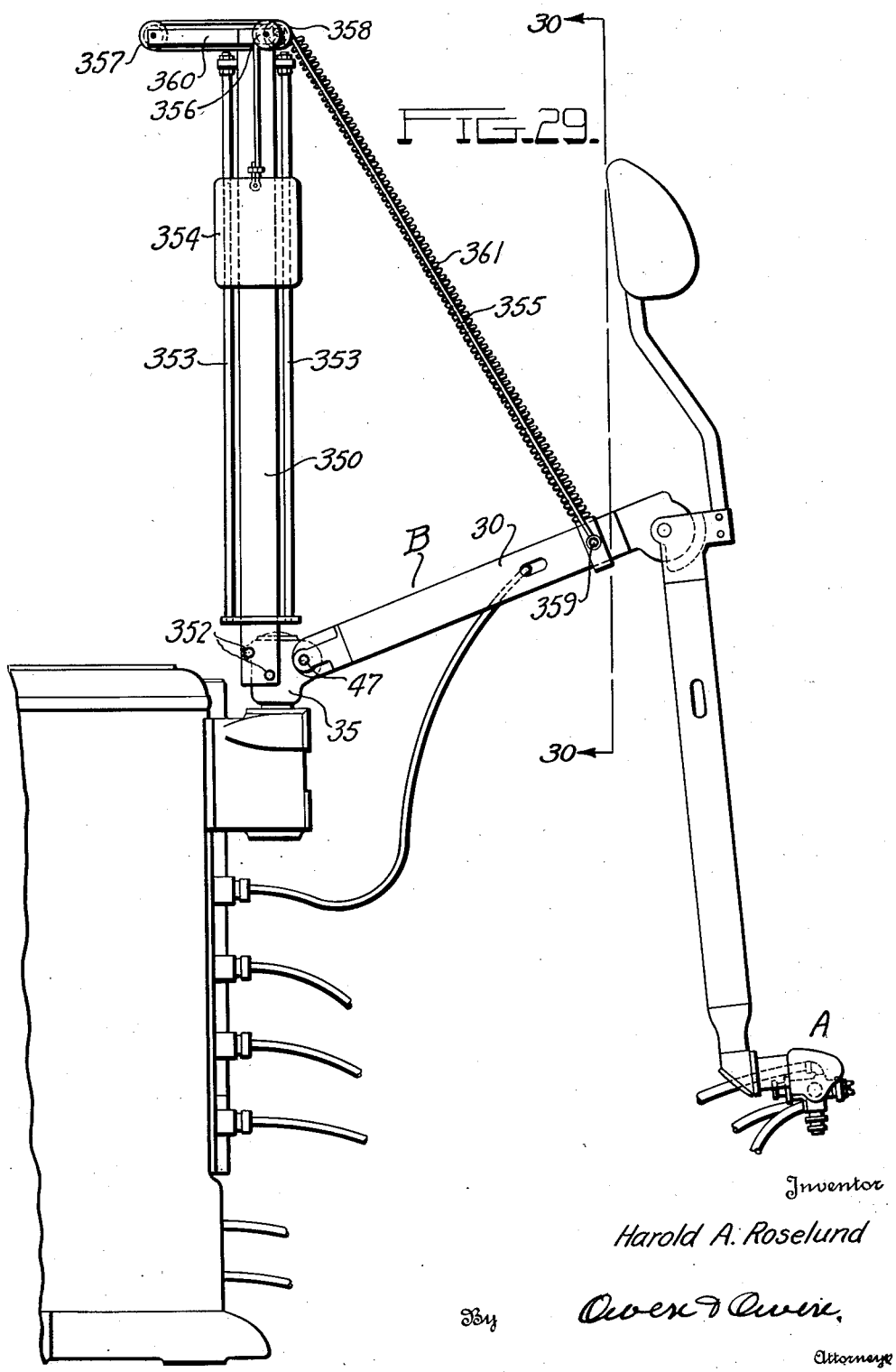

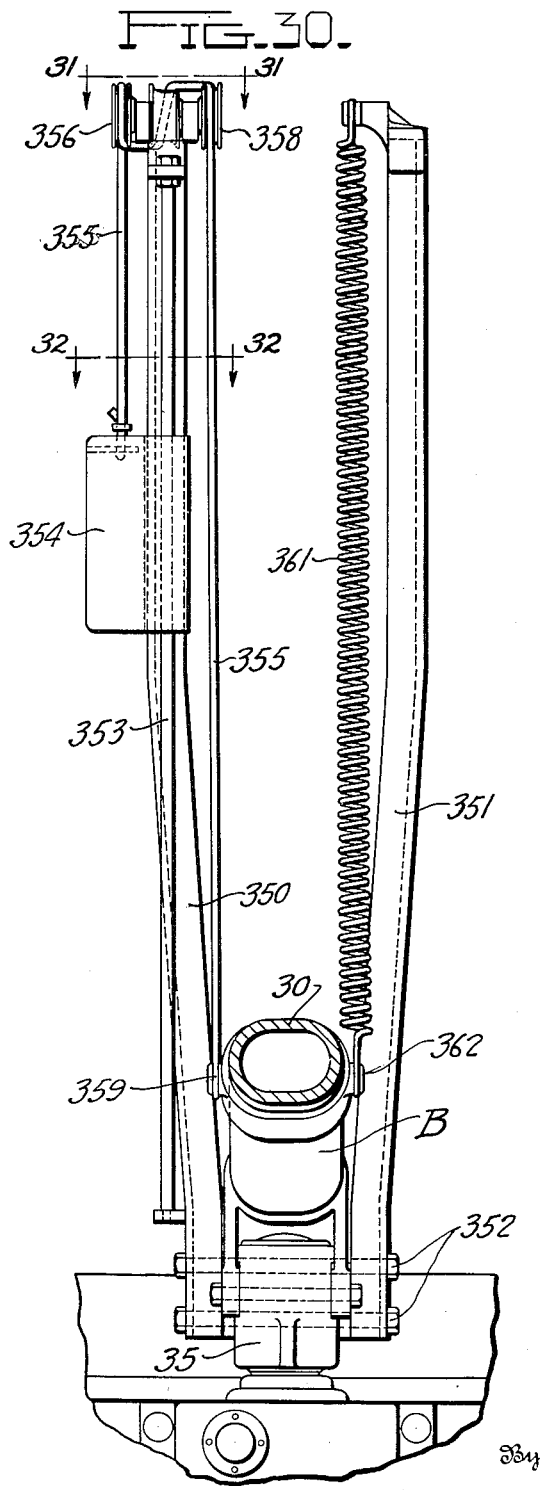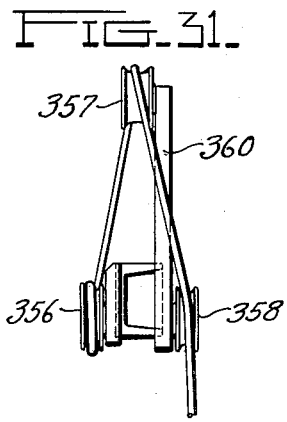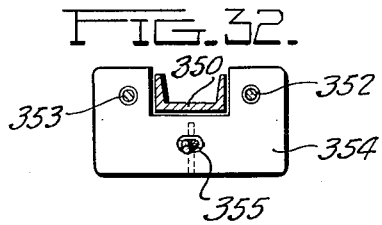

Patented Mar. 14, 1944

2,344,108

UNITED STATES PATENT OFFICE 2,344,108

MEANS FOR MOVING SPRAY GUNS OR OTHER DEVICES THROUGH PREDETERMINED PATHS

Harold A. Roselund, Toledo, Ohio, assignor to The De Vilbiss Company, Toledo, Ohio, a corporation of Ohio Application August 17, 1939, Serial No. 290,646

13 Claims. (Cl. 91—45)

This invention relates particularly to equipment for applying surface coating materials by spraying action successively to bodies of like shape and size, which bodies are either moved continuously or intermittently in successive order to and from spraying position, the present embodiment of the invention being intended more particularly for use in connection with the spraying of automobile bodies traveling in successive order on a conveyor, as in paint shops.

The primary object of the invention is the provision of a spray gun handling mechanism which is constructed for and automatically operated to impart predetermined spraying movements to a spray gun in simulation of the irregular movements of such a gun in the hands of a manual operator spraying a body or a predetermined portion thereof and to effect a body spraying action during such movement.

A further object of the invention is the provision of such a spray gun handling mechanism having a multi-jointed spray gun carrying arm, the movements of which are automatic and in simulation of the manual handling of a spray gun in performing a particular surface coating job, being controlled by a pattern made to suit such job, whereby the same spray gun movements may be repeated for successive like jobs, for instance for successive automobile bodies as they move into the range of the mechanism on a traveling conveyor.

Further objects and advantages of the invention will be apparent from the following detailed description thereof, and from the accompanying drawings illustrating one embodiment of the invention, and in which—

Figure 7:
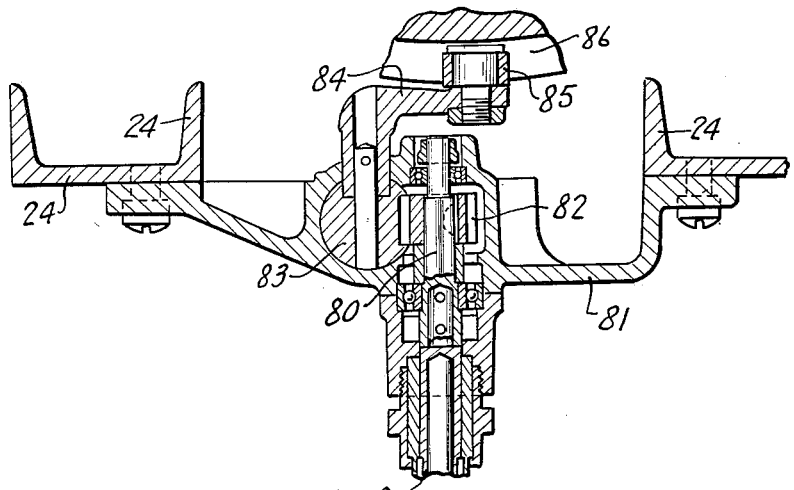
Figure 8:
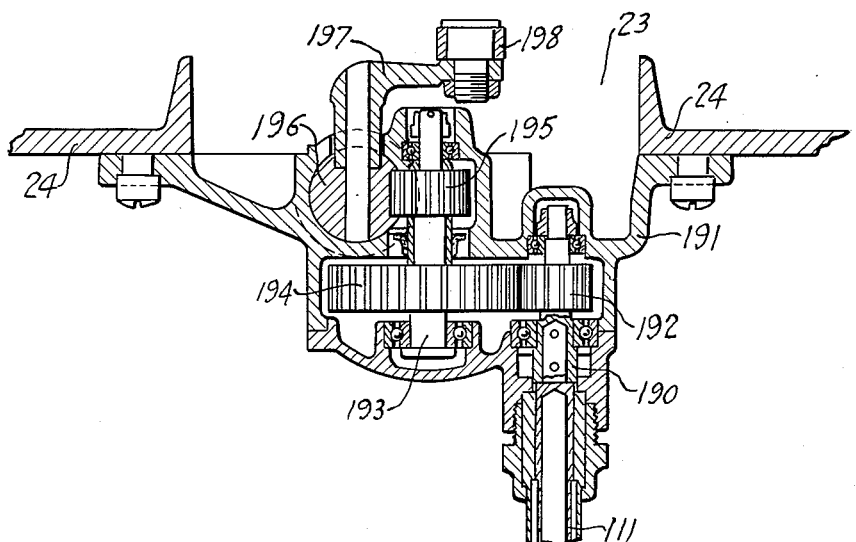
Figure 9:
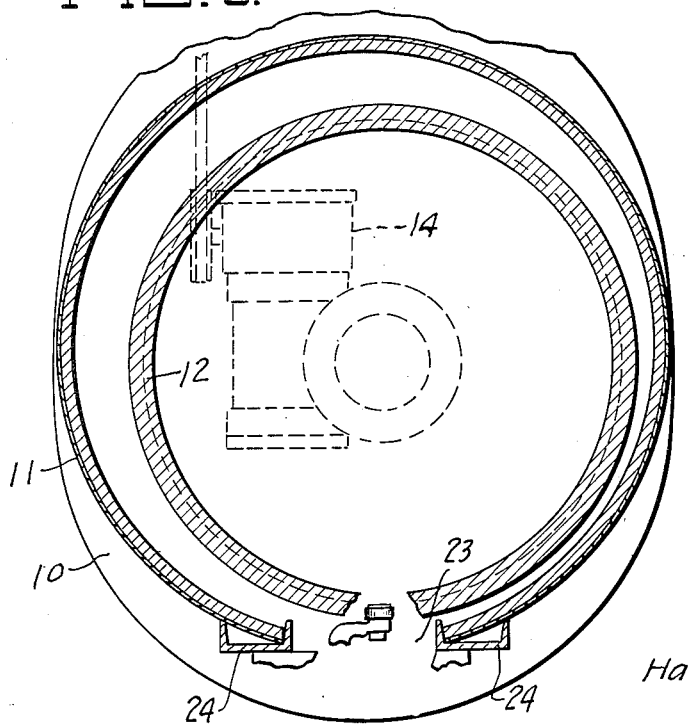

Figure 1 is a side elevation, with parts broken away, of an apparatus embodying the invention showing it in position for and in the act of spraying a body mounted for movement on a conveyor; Fig. 2 is an enlarged section and elevation taken on the line 2—2 in Fig. 1, with parts removed; Fig. 3 is a plan view of the apparatus shown in Fig. 1, with parts broken away; Figs. 4 and 5 are enlarged sections on the lines 4—4 and 5—5, respectively, in Fig. 2; Fig. 6 is an enlarged side elevation of the air pressure control means shown in Fig. 1, with parts broken away; Figs. 7 and 8 are sections on the lines 7—7 and 8—8, respectively, in Fig. 2; Fig. 9 is a section on the line 9—9 in Fig. 2, with parts broken away; Fig. 10 is a section on the line 10—10 in Fig. 4, with parts broken away; Figs. 11 and 12 are enlarged horizontal and vertical fragmentary sections of the elbow joint portion of the spray gun carrying arm with associated operating parts; Figs. 13 is an enlarged central longitudinal section taken vertically in Fig. 1 through the outer end portion of the forearm member of the spray gun carrying arm and through its wrist and hand portions, together with the associated operating means therefor, with parts in full; Fig. 14 is a section on the line 14—14 in Fig. 13; Fig. 15 is an enlarged detail of the spray gun with its material and air supply connections, and with parts broken away; Figs. 16, 17 and 18 are sections on the lines 16—16, 17—17 and 18—18, respectively, in Fig. 15; Fig. 19 is a perspective view of the yoke member employed in attaching the spray gun to the holder or hand portion of the control arm; Fig. 20 is a modified view similar to Fig. 1, with hydraulic control means for certain of the arm joints; Fig. 21 is an enlarged detail of the hydraulic control part shown broken away in Fig. 20; Fig. 22 is a cross-section on the line 22—22 in Fig. 21; Fig. 23 is an enlarged central vertical longitudinal section through the elbow joint portion of the arm in Fig. 20; Fig. 24 is a cross-section on the line 24—24 in Fig. 23; Fig. 25 is an enlarged cross-section on the line 25—25 in Fig. 20, with parts broken away and parts in full; Figs. 26 and 27 are modified views similar to Figs. 23 and 21, respectively, showing such parts adapted for positive hydraulic pressure actuated movements in both directions of the respective plungers; Fig. 28 is a diagrammatical view of the control circuit for the apparatus; Fig. 29 is a fragmentary view similar to Fig. 1 showing a modified counterbalancing means for the spray gun arm; Fig. 30 is an enlarged section on the line 30—30 in Fig. 29; Fig. 31 is a fragmentary plan view taken on the line 31—31 in Fig. 30, and Fig. 32 is a section on the line 32—32 in Fig. 30.

Referring to the drawings, I designates a conveyor which may be of the continuously moving type, such as commonly used in automobile paint shops, 2 a track on which the conveyor travels, and 3 a body to be painted and constituting one of a series mounted on the conveyor and movable thereby into and out of spraying range. It is customary in the paint shops of automobile factories to cause the conveyor to move continuously at a predetermined speed, whereby the automobile bodies carried thereby are successively brought into and moved slowly past spraying position. The present invention resides in an automatic means for moving a spray gun through a predetermined irregular path to spray a body 3 as it is moved by the same, either by continuous or intermittent movements of the conveyor, such path of movement of the spray gun simulating that of a manually operated spray gun in effecting the spraying of the accessible portion of a body of like design and shape with the operator standing in one position.

In the illustrated embodiment of the invention, 10 designates a base frame having a casing or housing 11 rising therefrom and enclosing a pattern drum 12. This casing, in the present instance, is of cylindrical form and closed at its top. The drum 12 is shown as disposed for rotation about a vertical axis, and is mounted at its lower end on a drive shaft 13 of stub form rising from a gear case 14, and at its upper end on a stub shaft 15. This shaft 13 is driven from a motor 16 through a suitable speed reduction gearing, as illustrated in Fig. 1.

The casing 11, at what may be termed its front side, has a vertically elongated opening 23 therein (Figs. 2 and 9) at the sides of which, on the casing, are secured the vertical mounting strips 24. A plurality of gear cases are mounted in superposed order on these strips crosswise of the opening 23 and the gear sets contained in these cases have operating connection with the drum 12 and with the respective joint mechanisms of a spray gun carrying arm, as hereinafter described.

A spray gun A is carried at the free end of an arm B having a plurality of relatively movable jointed sections corresponding to the upper arm, the forearm, the wrist and the hand of a human being, and with the joint connections between the upper arm section and its carrying means and between the several arm sections preferably such as to permit movements simulating the various movements of the respective portions of a human arm and hand. The sections of the arm B which correspond to the human upper arm, the forearm and the hand are designated 30, 31 and 32, respectively.

The shoulder joint connection of the arm section 30 with the drum 12 is through mechanism, a portion of which is mounted in a case 33 at the upper end portion of the casing 11 and attached to the strips 24 over the opening 23 in such casing. The case 33 (Figs. 1, 2, 5 and 10) has a hollow vertical shaft 34 mounted therein, with its upper end extending above the case and provided with a hollow head 35, the hollow of which opens into that of the shaft. The shaft 34 has suitable bearings 36 in the case 33 to permit horizontal turning of the shaft, and has a spiral gear 37 fixed thereto within the case. This gear meshes with a drive pinion 38 (Fig. 5) mounted on a shaft 39 journaled horizontally in the upper end portion of the case 33, with its axis projecting outward relative to the pattern drum 12. The shaft 39 carries a pinion 40 at its inner end in mesh with a rack-bar 41 mounted in and guided for vertical reciprocatory movements in the inner portion of the case 33 and having an angled arm 42 fixed thereto and projecting inwardly therefrom toward the drum through the casing opening 23, and carrying at its free end a roller 43 traveling within a cam groove 44 extended circumferentially around the drum 12. It is apparent that the roller 43 traveling in the cam groove 44 will impart vertical reciprocatory movements to the rack-bar 41 and this in turn will rotate the shaft 39 to effect a predetermined turning of the shaft 34 and its head 35 in accordance with the form of the groove.

The inner section 30 of the arm B has its inner end forked (Figs. 1, 3, 4 and 10) to provide the bearing arms 46, which are horizontally spaced and straddle one side of the shaft head 35, and have vertical rocking connection with said head through a cross shaft 47 journaled therein. This shaft projects from each side of the head 35 beyond the fork arms 46 to which it is fixed and fixedly carries a pinion 48 at each end without said arms for the purpose hereinafter described.

A spiral gear 49 (Figs. 4 and 10) is fixed to the shaft 47 within the hollow of the head 35 and meshes with a drive gear 50 fixed to the upper end portion of a vertical shaft 51. This shaft extends down through the hollow of the shaft 34 and through the lower end thereof into the case 33, being suitably journaled in the lower end of the shaft 34 and in the upper end of its head 35, as best shown in Fig. 10. A spiral gear 52 is fixed to the lower extended end of the shaft 51 and meshes with a drive pinion 53 fixed to a shaft 54 (Fig. 5). This shaft is journaled in the lower portion of the case 33 in parallel relation to and below the plane of the shaft 39 and carries a rack pinion 55 at its inner end in mesh with a vertically movable rack-bar 56. This rack-bar is guided in the case 33 in the same manner as the rack-bar 41 and has an angled arm 57 fixedly projecting therefrom without the inner side of the case 33 through the opening 23 in the drum casing 11 and has a roll 58 at its free end operating within a cam groove 59 of the drum 12. It is apparent that a rotation of the drum will impart vertical reciprocatory movements to the rack-bar 56 and this in turn will impart vertical rocking movements to the arm section 30 through the shafts 54, 51 and 47 and associated gearing in accordance with the form of the groove 59.

It is further apparent that horizontal rocking movements are imparted to the arm section 30 from rocking movements communicated to the shaft 34 and its head 35 and the connection of the former with the rack-bar 41, the arm 42 of which engages within the cam groove 44 of the pattern drum.

The weight of the arm B is counterbalanced by two arms 62 having weights 63 at their outer ends (Figs. 1 and 3) and having their inner ends mounted on the respective ends of a shaft 65 projecting from the head 35 (Fig. 4). The arms 62 are fixedly connected to respective pinions 66 mounted loosely on the shaft 65 therewith, and these pinions are connected to the respective pinions 48 through intermediate idler pinions 67. The connection between and relative positioning of the arm section 30 and weight arm 62 are such that when one is in horizontal position the other will also be in such position, and a raising of the arm section 30 will cause a raising of the weight arm, thus causing a perfect balancing of the arm B in any position of its movement.

The elbow joint for the arm B, which is between the arm sections 30 and 31, is shown in sectional detail in Figs. 11 and 12. In the present form of such joint, the section 31 has its inner end forked as shown at 70, and straddling a narrowed end portion 71 of the section 30. The portion 71 is preferably in the form of a gear housing. The parts 70 and 71 are pivotally connected by a horizontally disposed cross-shaft 72, which is journaled in the housing 71, and has a spiral gear 73 mounted centrally thereon within the housing. In the present instance, the shaft 72 includes a sleeve 74 to which the gear is keyed, and the ends of this sleeve are interconnected with the arms of the fork 70, as shown in Fig. 11, to cause a pivotal movement of one with the other.

The gear 73 is in mesh with and driven by a pinion 75 carried by a shaft 76 mounted for free rotation in the housing 71 above said gear (see Fig. 12). This shaft has driving connection, as at 77, with a flexible shaft 78 which, in the present instance, extends through a side opening 79 in the arm section 30 (Fig. 1) and to a shaft 80 mounted in a gear case 81 fixed to the casing strips 24 below the gear case 33 (Figs. 1, 2 and 7). The shaft 80 is horizontally disposed and carries a pinion 82 within the case 81 in mesh with a rack-bar 83. This rack-bar carries an angled arm 84 which at its free end is provided with a roller 85 traveling in a cam groove 86 in the drum 12. It is thus apparent that vertical reciprocatory movements of the rack-bar 83, as its roller follows the cam groove 86, will impart vertical rocking movements to the arm section 31 relative to the section 30 through the intermediate shafts and gearing.

The arm section 31 is counterbalanced relative to the arm section 30 by a weighted arm 87, fixed to the inner end of the section 31 and projecting outwardly lengthwise thereof.

The section 31 of the arm B terminates at its outer end in a right-angularly projecting wrist portion 90 in which is disposed the wrist joint carrying the hand member 32 of said arm. This hand member is hollow and has the hollow shaft 91 (Fig. 13) projecting from its inner end into the hollow wrist part 90 and journaled therein for rotation in coaxial relation to the member 90, the bearings for such shaft being designated 92. The driving means for the shaft 91 will be later described.

The wrist member 90 is rotatable about the longitudinal axis of the arm section 31 and for such purpose is fixed to and projects at right angles from the outer end portion of a sleeve 95 that is journaled for rotation in a housing part 31ᵇ forming the forward end portion of the arm 31, as best shown in Fig. 13, with its axis of rotation disposed longitudinally of the arm. The arm bearings for this sleeve are designated 96. A gear 97 is fixed to the inner end of the sleeve 95 and is driven by a pinion 98 carried by a shaft 99 journaled in one side of the rear end portion of the housing part 31ᵇ lengthwise thereof. The shaft 99 is connected by a flexible shaft 111 to an associated drive means which is connected to and operated by a rotation of the drum 12 as hereinafter described.

For the purpose of imparting rotation to the hand member 32 about the axis of its shaft 91, such shaft is provided at its inner end with a bevel gear 105 (Fig. 13) in mesh with a bevel gear 106 on the forward end of a hollow shaft or sleeve 107 extending through and mounted concentrically in the sleeve 95 for rotation relative thereto, the bearings between the two sleeves being shown at 108. The rear end of the sleeve 107 is connected through a pair of gears 109 to a shaft 110 journaled in a side portion of the housing part 31ᵇ at its rear end and substantially diametrically opposed to the mounting of the shaft 99. The shaft 110 has a flexible shaft 100 extending therefrom and connected to and driven by the drum 12 as hereinafter described.

The gun A is carried by the member 32 by an arm 115 (Figs. 14, 16, 17) on the gun fixedly attaching to the outer end of a cross shaft 116 (Fig. 14) journaled in the member 32 at one side of its turning axis, which latter is coaxial with the wrist extension 90 and shaft 91. The shaft 116 carries a spiral gear 117 within the hollow of the member 32 and this meshes with a drive pinion 118 on a shaft 119 (Fig. 13), which is journaled in the member 32 in coaxial relation to its turning axis and extends axially through its shaft 91. The inner end of the shaft 119 carries a bevel gear 120 in mesh with a bevel gear 121 on a shaft 122, which is journaled in and extends axially through the hollow shaft 107 in the housing 31ᵇ at the forward end of the arm section 31. The shaft 122 has connection through a flexible shaft 123 with and is operated by the cam drum 12 in the same manner as the shafts 100 and 111 as hereinafter described.

The flexible shafts 100, 111 and 123 are preferably carried up to and attached to the arm section 30 near its outer end for movements therewith and then preferably extend to the inner end portion of the arm section 31 and through an opening therein and thence outwardly within said section to the respective shafts 110, 99 and 122 in the forward end portion of the arm section 31 with which they connect.

It is apparent that the described connection of the gun A with the arm section 31 is such as to permit the gun to have a universal movement with respect to such arm section, such movement being accomplished through the provision of three wrist joints, one being the joint which permits angular movement of the wrist part 90 about the arm section axis, a second being the joint which permits rotation of the member 32 about an axis coincident with that of the wrist part 90, and the third being the joint which permits revoluble movement of the spray gun about the axis of the shaft 116, the axis of each of these joints being at right angles to the other two.

The flexible shaft 111 is connected at its inner or drum end to a shaft 190 mounted in horizontal position within a case 191 attached to the drum casing 11 across the opening 23 therein and such shaft carries a driven pinion 192 (Fig. 8). A second shaft 193 is mounted in the case 191 in parallel relation to the shaft 190 and carries a gear 194 in mesh with the pinion 192 and also a rack pinion 195 in mesh with a rack-bar 196 which is mounted for vertical reciprocatory movements in said case. This rack-bar has an arm 197 fixedly projecting therefrom and carrying a roller 198 in position to travel in a registering cam groove 199 around the drum face. It is apparent that reciprocatory movements of the rack-bar 196, induced by the formation of the drum groove 199 as the roller 198 travels therein, imparts predetermined rotation in the flexible shaft 111 to effect the desired angular movement to the wrist part 90 about the axis of the arm section 31. For the purpose of such movement, it is desired to speed up the rotation of the shaft 111 relative to that of the shaft 193 which is directly driven by the rack pinion, and for this purpose the gear 194 is larger than the driven pinion 192, the ratio, in the present instance, being approximately three to one.

The flexible shaft 100 is in driven connection with a cam groove 200 in the drum 12 through a mechanism the same or similar to that shown in Fig. 8, such mechanism being mounted in a case 201 on the drum casing 11. In like manner, the flexible shaft 123 is in driven connection with an actuating groove 202 in the drum through a mechanism like or similar to that shown in Fig. 8, which is mounted in a case 203 on the drum housing. It will be understood that the ratio of the pinions 192 and 194 in the operating mechanism for each of the shafts 111, 100 and 123 may be changed to suit the length and speed of movements of the parts with which they are respectively connected, namely, the wrist part 80, the hand part 32 and the gun A relative to the latter.

The spray gun A, best shown in Fig. 15, may be of any type suitable for spraying surface coating materials by the action of a fluid, such as air under pressure. As the construction of such a gun per se, so far as its use in connection with the present invention is concerned, is not novel, it need not be specifically described.

The gun illustrated has the material supply tube 129 attached to the body of the gun and in communication with the interior of its material spray nozzle 130. It also has double communication with a source of air pressure supply through tubes 131 and 132, the latter being connected to the air discharge orifices of the air nozzle 133 and the other being connected to the interior of the cylinder 134 at the rear end of the gun body for operating the plunger 135 to which the material valve 136 is attached, as well understood in the art. The air tubes 131 and 132 are connected to the gun through a detachable coupling head 137 which enables different guns to be easily and quickly connected up with the air supply.

The coupling head 137 is clamped sideways against the flat surface of a side extension 138 of the gun body by the action of a clamping yoke 139. This yoke is of U-form (Figs. 17, 19), having its legs provided in opposite side edges thereof with notches 140 for engaging respective pins 141 on the gun body by a relative angular movement of the yoke thereon. The coupling head 137 has a stem 142 projecting from its outer side through a central opening in the loop portion of the yoke, and rotatably mounted on this is a sleeve 143 which threads through the yoke opening and shoulders at its inner end against the coupling head, whereby a turning movement of the sleeve in one direction will draw the yoke outward into firm clamping engagement with the pins 141 and will force the coupling head to its seat against the gun body. The sleeve 143 is rotatably mounted on the stem 142 by the screw 144, which threads into said stem and has its head in coaction with the outer end of the sleeve.

The inner face of the coupling head 137 is provided with an annular recess 145 (Fig. 15) in communication with the tube 131 (Fig. 16) through a suitable head bore and adapted, when clamped to the gun, to register with a recess 146 in the coacting face of the gun part 138 and through it and suitable passages in the gun body with the interior of the air nozzle 133. The coupling head is centered with respect to the gun body by a stud 147 on its inner face entering a guiding recess 148 in the gun body, and communication is had between the air tube 132 and the interior of the cylinder 134 through suitable passages 149 in the coupling head, the recess 148 and a passage 150 in the gun body.

In the use of apparatus of this character, it is desirable to have several spray guns connected to different sources of material supply, such for instance as paints of different color, so that when it is desired to use a particular material, the gun for supplying the same may be quickly attached to the air coupling head 137 and to the control arm B through the means of the clamping yoke 139. In this connection, there is illustrated in Fig. 1 a plurality of separate spray guns A' having their tubes 129 connected to different material supply lines 160. Only one gun is shown as attached to the control arm B. The remaining guns are shown as supported on a rack 161.

An automatic control for the supply of air to the gun through the tubes 131 and 132 is located, in the present instance, below the bottom portion of the drum 12 and is cam actuated by rotation of the drum, so that the air pressure to the gun is turned on at the beginning of a cycle of operations and turned off at the end of such cycle. One embodiment of this control is shown in Figs. 1 and 6 and includes a casing 165 mounted in the drum casing 11 below a bottom edge portion of the drum. This housing has an upwardly extending bottom passage 166 connected at its lower end to a source of high pressure supply through a tube 167 and has a similar passage 168 in connection with a regulated source of air pressure supply through a tube 169. The passage 166 has valve controlled communication with the gun tube 132 through a passage 170 in the part 165 while the passage 168 has valve controlled communication through a passage 171 with the gun tube 131. The passages 166, 170 and 168, 171 are normally closed by valves 172 and 173, respectively, the stems of which project up through the top of the case 165 in position to be engaged and opened by a lowering movement of the valve actuating elever 174. Each valve stem is normally held seated by the action of a spring 175. The lever 174 is fulcrumed on the top of the case 165 and is normally held raised or in valve released position by a spring 176. A roller 177 is carried by the outer free end of this lever and is engaged by a cam track 178 provided on the bottom of the drum 12 at or adjacent to its outer edge.

The passage 170 has a relief passage 180 to the atmosphere, which is controlled by a valve 181. This valve is normally held seated by the action of a spring 182 and its upper end is in register with the inner extended end of the lever 174, so that the valve is held open thereby when the lever is in position to permit the valves 172 and 173 to be closed. The lever 174 carries a thrust screw 183 for each valve stem and these may be regulated to cause actuating engagement of the lever with the respective valve stems at predetermined points in movements of the lever.

When the drum has completed a cycle, the control lever 174 is permitted to stand in the position noted in Fig. 6 with both valves 172 and 173 closed and with the vent valve 181 open. When a cycle of movement of the drum has started and it is desired to commence the spraying action, the lever 174 is lowered by the action of the cam 178 sufficiently to effect an opening of the valves 172 and 173 and to permit a closing of the relief valve 181. The thrust screws 183 are so adjusted that the valve 172 for the high pressure air to the gun cylinder 134 is first opened, after which the valve 173 is opened to permit air under regulated pressure to pass to and from the spray head 133, and at approximately the same time the relief valve 181 is closed. When the relief valve 181 is closed the air pressure in the cylinder 134 is raised sufficiently to actuate the plunger 135 and open the material valve 136. When the opening of the material valve 136 takes place, the air is discharging under full regulated pressure from the air nozzle 133, so that immediately upon the opening of such valve the material discharging from the nozzle 130 is picked up and atomized by the discharging air.

It will be understood that, as is customary with spray guns of this character, the material is supplied to the gun nozzle under pressure either induced by gravity action or by air pressure in the material supply tank, as well understood in the art.

In the modification shown in Figs. 20 to 25, hydraulic means are substituted for the flexible shafts 78, 111, 100 and 123 and for the drum actuated mechanisms therefor for operating the respective joints of the arm B. Attached to the drum casing 12 within the opening 23, in association with each drum groove 86, 199, 200 and 202, is a vertically disposed cylinder 211. Each cylinder, in the present instance, has an open lower end and a closed upper end, except for a fluid connection with the latter. A plunger 212 operates in each cylinder and has its upper end cupped to hold compression. A boss 213 projects from the inner side of each plunger through an opening 214 in the casing and carries a roller 215 within the respective drum groove with which associated.

The hydraulic unit cylinder 211 associated, in the present instance, with the drum groove 86, has its upper closed end connected by a tube 220 to one end of a cylinder 221 (Figs. 23 and 24) provided in the outer end of the arm section 30 crosswise of the shaft 72 and in substitution for the shaft 77 and pinion 75 shown in Fig. 12. A plunger 222 operates in the cylinder 221 and is provided at one side with a rack-bar 223 in engagement through a side opening in the cylinder with a rack pinion 224 mounted on the shaft 72. This pinion is fixed to the sleeve 74 on said shaft, which sleeve in turn is interengaged at its ends with the fork arms 70 of the arm section 31 to turn with said arm section the same as previously described in connection with said sleeve. The plunger is moved in one direction within the cylinder 221 by the forcing of fluid under pressure into said cylinder from the line 220, and it is moved in the other direction by suction action when the plunger is drawn out of the cylinder, such action being augmented by a coiled compression spring 225 disposed between the plunger and the opposite end of the cylinder. With the present arrangement, the forcing of fluid into the cylinder 221 moves the plunger 222 in a direction to swing the arm section 31 downward and inward.

A supply passage 226 for oil, or other suitable operating fluid, is uncovered to the upper end of the cylinder by the plunger at the lower end of its stroke, so that the operating fluid may be supplied thereto to take the place of any which may have leaked out. The passage 226 is connected to a supply tube 227 leading, in the present instance, from a gravity tank 228.

The hydraulic operating means for each of the shafts 99, 110 and 122 disposed in the outer end of the arm section 31 includes a respective cylinder 230, 231 and 232 carried by said arm section crosswise thereof, as best shown in Fig. 25. The cylinder 230 has a plunger 233 and this is provided on one side with a rack-bar 234 in mesh with a rack pinion 235 on the shaft 99. The cylinder 231 has a similar rack-bar plunger 236 in mesh with a pinion 237 on the shaft 110. Likewise, the cylinder 232 has a rack-bar plunger 238 in mesh with a rack pinion 239 on the shaft 122. The cylinders 230, 231 and 232 have supply connection with the cylinders 211 associated with the respective drum grooves 199, 200 and 202 through the tubes 240, 241 and 242, respectively. The operation of the plungers in these cylinders is similar to that of the plunger in cylinder 221.

It will be understood that a turning of the drum 11 through a cycle will cause a requisite movement to be imparted to the various plungers 212 to impart the desired joint operating movements to the respective rack-bar plungers associated with the arm B.

While the invention has been particularly described in connection with a machine for wielding a spray gun to cause its discharge nozzle to traverse a predetermined irregular path, it is capable of use for wielding other tools or devices and directing the movement thereof through a predetermined path.

In Figs. 26 and 27, the hydraulic means for each joint operating means of the arm is shown as being double acting so that a movement of the associated drum actuated operating plunger in either direction will impart positive movement in one direction or the other to the rack-bar plunger of the joint with which connected. For this purpose, each drum cylinder 245 has a connection with each end of the joint cylinder 246 through a respective connection 247, and there is provision at each end of the cylinder to supply additional operating fluid thereto.

A pattern member 11 may be provided for each particular paint job, the various cam grooves thereof being formed to actuate the associated rack-bar means to impart the desired predetermined movements to the several joints of the gun carrying means to effect a spraying of the job. The cam groove diagram for any particular job may be plotted in various ways. For instance, a drum with a plain circumferential surface may be provided in the drum housing and some provision made for marking thereon the cam paths of the various rollers of the motion transcribing mechanisms while the drum is being slowly rotated and while a skilled paint spraying operator is manually moving the gun through a path suitable for a painting of the particular job as it moves past him on the conveyor. When the drum grooves have thus been marked so that a complete painting cycle may take place during a rotation of the drum, the grooves are cut therein in any suitable manner.

It will be understood that the groove layouts appearing in the drawings are merely illustrative of the idea and not intended to represent a correct layout for any particular job, as the formation of the grooves vary with the jobs.

For the purpose of proper synchronous action of the cam drum and conveyor 1, means is provided whereby as each article to be painted is moved into spraying position, the circuit for the motor 16 is closed and remains closed during a complete painting cycle and is then opened to permit the cam drum to stand at rest until the next article on the conveyor is brought into spraying position, when the above action is repeated. In Fig. 28, which illustrates a suitable control circuit for this purpose, the motor 16 is shown as disposed in a main circuit 300, having a main line switch 301 and a normally open starting switch 302 therein. The switch 302 is closed at predetermined points in a movement of the conveyor by engagement of a cam projection 303 theron with the movable element 304 of the switch, one of these projections being provided on the conveyor for each article carried thereby to be painted and in position to start the spraying action at the proper time therefor. A connection 305 is provided across the circuit 300 and has a normally closed stop switch 306 therein, which is in parallel with the starting switch 302. When the drum has completed a cycle of movements, a short cam projection 307, in the present instance at its lower edge, Fig. 1, engages the movable element 308 of the switch 305 and moves it to open position, thereby stopping the motor and drum. A box 309 in Fig. 1 contains the switch 305.

The operation of the apparatus is as follows: A cam drum 12 suitable for the job to be painted having been mounted in the housing 11 and the movement of the conveyor 1 with the articles 3 thereon started, the drum operating circuit 300 is closed by engagement of the conveyor cam 303 with the movable element 304 of the starting switch 302. This starts the motor 16 and the connected drum 12. The movement of the drum having started, the stop switch 306, which is in parallel circuit with the switch 302, is permitted to close by reason of the projection 307 on the drum moving from engagement therewith and after this the cam 303 on the conveyor passes from engagement with and permits an opening of the starting switch 302. As the drum rotates, each mechanism actuated thereby has predetermined movements imparted thereto by reason of its drum cam formation to cause certain predetermined movements to be imparted to the gun nozzle, so that the combined movements of said mechanisms effect movement of the gun nozzle through a predetermined path at a side of an object 3 to be painted. The mechanism controlled by the drum cam 44 acts through the rack-bar 41, shafts 31 and 34 and interposed gears (Figs. 5 and 10) to impart horizontal swinging movements to the jointed arm B. The mechanism controlled by the drum cam 59 acts through the rack-bar 56, shafts 54, 51 and 47, and interposed gears (Figs. 4, 5 and 10) to impart vertical swinging movements to the inner section 30 of the arm B. The mechanism controlled by the drum cam 86 acts through the rack-bar 83 and its pinion 82 to impart rotation to the flexible shaft 78 (Fig. 7) which in turn extends to the joint between the arm sections 30 and 31 and drives the shaft sleeve 74 through the interposed gears 73, 75, and imparts vertical swinging movements to the shaft section 31 (Figs. 11 and 12). The mechanism controlled by the drum cam 199 acts through the rack-bar 196, shaft 193 and interposed gearing (Fig. 8) to drive the flexible shaft 111, which in turn is connected to and drives the sleeve 95 in the wrist end portion of the arm section 31 (Fig. 13) and imparts angular movement to the wrist section 90 about the axis of said arm section. The mechanism controlled by the drum cam 200 acts through a mechanism similar to that shown in Fig. 8 to drive the flexible shaft 100, which extends to the wrist end portion of the arm section 31 and is connected to and drives the sleeve 107, which in turn is connected to and drives the shaft portion 91 of the gun carrying part 32 and causes rotation of such part about an axis concentric to that of the wrist part 90. The mechanism controlled by the drum cam 202 acts through a mechanism similar to that disclosed in Fig. 8 and drives the flexible shaft 123, which in turn extends to the wrist end portion of the arm section 31 and has geared connection with the gun body through the shafts 119, 116 and interposed gearing (Figs. 13 and 14) to effect swinging movements of the gun body relative to the carrying part 32.

The air pressure for operating the spray gun is obtained through tubes 131 and 132, which are respectively supplied with air under pressure from tubes 169 and 167, the former being regulated pressure for supplying the spray nozzle of the gun and the other being high pressure air in communication with the gun cylinder 134 for acting on the plunger 135 to open the material control valve 136. At the proper time in a cycle of movements of the cam drum 12 for effecting an operation of the gun, the lower cam edge 178 of the drum acts on the control lever 174 (Figs. 1 and 16) to move it to open the valve 172 in the high pressure line and then the valve 173 in the regulated pressure line, and at the same time permits a closing of the high pressure relief valve 181, thus effecting an opening of the material valve 136 in the gun and also a discharge of air from the gun nozzle to effect an atomizing discharge of material therefrom, as well understood in the art.

When the painting of an article 3 has been completed, the cam 307 on the lower edge of the drum 12 engages the movable element 308 of the stop switch 306 and opens such switch. At approximately the same time, the cam 178 at the lower edge of the drum permits the air control lever 174 to move to position to close the two air lines 131 and 132 to the gun and open the relief valve 181, thus stopping the spraying action.

It is apparent that the above-described cycle of operation may be repeated for each article to be painted; also that the speed of movement of the cam control member (drum 12 in the present instance) is timed and regulated so that it preferably has a complete cycle of movement for each article to be painted.

In Figs. 29 to 32 is illustrated a different form of counterbalancing means for the arm B to that shown in Figs. 1, 2, 3, 4 and 10. The latter form is satisfactory to properly counterbalance the arm when its movement is confined to an arc which, for instance, is not more than 45° from a horizontal. Above said point the counterbalance weight 63, which raises and lowers uniformly with the arm, begins to lose its effectiveness and this continues until it is entirely lost when the weight arm is in vertical position.

In the form of counterbalancing means shown in Figs. 29 to 32, two spaced standards 350 and 351 fixedly rise from the horizontally rotatable head 35, being fixed to one side thereof by bolts 352. The standard 350 carries a pair of spaced vertical guide bars 353 which guide vertical movements of a weight 354, as best shown in Fig. 32. The weight cable 355 extends up from the weight over a sheave 356, thence rearwardly around a sheave 357 and forwardly therefrom over a sheave 358, after which it extends and is attached to the arm B, as at 359. The three sheaves are carried by the standard 350 at its upper end and by a cross-arm 360 thereon, as best shown in Fig. 31. A coiled contractile spring 361 is attached at its lower end to the arm B at 362, such point being the same distance from the outer end of the arm section 30 as the point of connection therewith of the weight cable 355. The upper end of the spring is connected to the upper end of the standard 350 at a point which is substantially coaxial with the sheave 358 so that the lengths of the spring and of the cable 355 between the arm section 30 and sheave 358 are substantially equal.

With this form of counterbalancing means, the counterbalancing action of the weight 350 on the arm is substantially uniform throughout the vertical swinging movement of the arm. It is apparent, however, that the effective weight of the arm increases as it approaches a horizontal from a vertical position, and it is the purpose of the spring 361 to compensate for this difference in action. In other words, the tension of the spring 361 as it expands under a lowering movement of the arm increases in approximately the same proportion as the effective gravity action of the arm, thus causing the spring to cooperate with the weight 354 to impart a substantially uniform counterbalancing action to the arm irrespective of the portion of the vertical arc through which it may be moving.

In this form of the invention, the control for the vertical movement of the arm B is the same as in Figs. 1, 2, 3, 4 and 10, the end of the shaft 47 to which the arm section 30 is fixed being shown in Fig. 29. The gears 48, 66 and 67, which connect the arm section 30 to the counterweight 62 in Fig. 1, are not needed in the modified form and are therefore eliminated.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a machine of the class described, a carrier arm swingable in two intersecting planes and having a relatively swingable wrist section, a spray gun carried by the wrist section, and mechanism having a cam pattern member and operable by predetermined movements of said member to impart predetermined swinging movements to said arm in different planes and to impart predetermined swinging movements to said wrist section relative to the arm to cause the gun to move through a predetermined path.

2. In a machine of the class described, a carrier arm swingable in two intersecting planes and having a relatively rotatable wrist section, a spray gun swingingly carried by the wrist section, and mechanism having a cam pattern member and operable by predetermined movements of said member to impart predetermined swinging movements to said arm in different planes and to impart predetermined swinging movements to said wrist section relative to the arm and predetermined swinging movements to the gun relative to the wrist section to cause the discharging end of the gun to move through a predetermined path.

3. In a machine of the class described, a carrier arm swingable in intersecting planes and having inner and outer major sections, a wrist section and a hand section jointed together each for swinging movements relative to the other, a spray gun carried by the hand section, and mechanism including a cam pattern member connected to each of said sections and operable by predetermined movements of the pattern member to actuate the respective sections to move the gun through a predetermined path.

4. In a machine of the class described, a swingingly mounted carrier arm having a pivotally connected section, a spray gun carried by the arm at its outer end, a movable pattern member and an operating connection between said member and section including a gearing on the arm, a gearing associated with said member, and drive means intermediate said two gearings including a flexible shaft, said connection being operable by predetermined movements of the pattern member to operate said arm section to impart predetermined movements to said gun.

5. In a machine of the class described, a carrier arm having a plurality of pivotally jointed sections, a spray gun carried by said arm at its outer end, a movable pattern member having a cam portion, a rack member associated with and reciprocably operated by said cam portion when the pattern member is moved, and a connection between said rack member and a section of said arm to impart predetermined movements thereto relative to the adjoining section when predetermined movements are imparted to the pattern member, said connection including a rotatable flexible shaft.

6. In a machine of the class described, a swingingly mounted arm having at its free end portion an angularly revoluble wrist section, a hand section rotatably carried by the wrist section, and a spray gun swingingly carried by the hand section, and mechanism including a movable cam pattern member having separate driving connections with said arm and each of said sections and gun to impart predetermined movements to each to cause a movement of the discharge nozzle of the gun through a predetermined path when predetermined movement is imparted to the pattern member, each connection with said sections and the gun including a flexible driving shaft.

7. In a machine of the class described, a swingingly movable carrier arm having a plurality of pivotally jointed sections and adapted to carry a device at its outer end, a movable pattern member having a plurality of cam portions, a rack member associated with and reciprocably operated by each cam portion of the pattern member when the latter is moved, an operating connection between one rack and said arm to impart predetermined movements to the latter from movements of the former, and flexible operating connections between the other rack members and respective arm sections and operable to impart predetermined movements thereto relative to an adjoining section when predetermined movements are imparted to the rack members.

8. In a machine of the class described, an arm-like extension mounted for various swinging movements and being divided lengthwise into a plurality of pivotally jointed sections, a movable pattern means having a plurality of cam portions, a rack member associated with each cam portion of said means and having respective predetermined movements imparted thereto by predetermined movements of the means, operating connections between two of said rack members and the inner end portion of said extension to impart predetermined swinging movements to the extension when the respective racks are moved, and a respective flexible driving connection between said other rack members and respective arm sections to impart predetermined movements to each section relative to the section by which carried when predetermined movements are imparted to the respective rack members whereby to move a device carried by said extension through a predetermined path.

9. In a machine of the class described, a swinging support, a device wielding arm projecting from said support for swinging movements relative thereto in a plane different from the plane of movement of the support, said arm being divided lengthwise into a plurality of pivotally connected sections with the outer end section adapted to carry a device, a geared connection between said support and arm operable to impart swinging movement to the arm relative to the support, and mechanism operable to impart predetermined swinging movements to said support to operate said geared connection to impart predetermined swinging movements to the arm relative to the support, and having flexible driving connection with the arm sections to impart predetermined relative movements thereto, said operating movements being synchronized to cause a device carried by the arm to move through a predetermined path.

10. In a machine of the class described, a swinging support, a device wielding arm projecting from said support for swinging movements relative thereto in a plane different from the plane of movement of the support, said arm being divided lengthwise into a plurality of pivotally connected sections with the outer end section adapted to carry a device, and mechanism operable to impart predetermined synchronized pivotal movements to the support, to the arm relative to the support and to the sections of the arm relative to each other to move a device carried thereby through a predetermined path, said mechanism including cam means having a plurality of cam portions, a separate rack bar connected to and operated by each cam portion, and a driving connection between the rack bar and a respective one of said support, arm and arm sections.

11. In a mechanism of the class described, a swingingly mounted arm, an angular wrist section having one end rotatably mounted in the outer end of said arm and its other end projecting laterally therefrom, a hand section rotatably carried by the wrist section with its axis of rotation at an angle to that of the wrist section, a spray gun carrying section rotatably carried by said hand section for angular movements relative to the hand section turning axis, means for imparting predetermined swinging movements to the arm, and means for imparting predetermined movements to said wrist, hand and gun carrying sections relative to each other and to said arm in synchronized relation to the movements of the arm to move a spray gun carried thereby through a predetermined path.

12. In a machine of the class described having a body part, a support mounted for horizontal pivotal movements on said body part, a device wielding arm carried by and projecting from the support for vertical pivotal movements relative thereto and divided lengthwise into a plurality of sections pivotally joined end to end, with the outer section adapted for carrying a device, and mechanism having separate cam actuated connections with and operable to impart predetermined movements to each of said support, arm and sections in synchronized relation to move a device carried by the outer section through a predetermined path.

13. In a machine of the class described, a tool carrying arm mounted for swinging movements in different planes and including an inner arm section, an outer arm section and a tool carrying section having end to end jointed connections respectively whereby the arm and its sections may have movements resembling the permissible movements of a human arm and its corresponding members, and mechanism operable to impart predetermined movements to the arm and each of its sections relative to each other to move a tool carried thereby through a predetermined path, said mechanism including pattern means and operating connections respectively between said pattern means and the arm and the sections.

HAROLD A. ROSELUND.